(12) United States Patent
Klinghult et al.

(10) Patent No.: US 7,937,113 B2
(45) Date of Patent: May 3, 2011

(54) GRAPHICAL DISPLAY

(75) Inventors: Gunnar Klinghult, Lund (SE); Mats Kleverman, Helsingborg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 609 days.

(21) Appl. No.: 11/533,891

(22) Filed: Sep. 21, 2006

(65) Prior Publication Data
US 2008/0039073 A1   Feb. 14, 2008

Related U.S. Application Data

(60) Provisional application No. 60/836,967, filed on Aug. 11, 2006.

(51) Int. Cl.
*H04B 7/00* (2006.01)
*H04B 1/38* (2006.01)
*H04M 1/00* (2006.01)

(52) U.S. Cl. ................. 455/566; 455/425; 455/66.1
(58) Field of Classification Search ............ 455/425, 455/66.1, 566
See application file for complete search history.

(56) References Cited

U.S. PATENT DOCUMENTS
6,111,755 A * 8/2000 Park ..................... 361/727

FOREIGN PATENT DOCUMENTS
WO  WO 00/79372  12/2000
WO  WO 2005/071604  8/2005

OTHER PUBLICATIONS

Motorola ROKR E1 User Guide 2005.*
Motorola ROKR E1 Parts List.*
Motorola ROKR E1 CNET Review Sep. 2005.*
A History of Electroluminescent Displays, Jeffrey Hart, 1999.*
World's Largest 21-inch OLED for TVs from Samsung, Jan. 2005.*
Kenwood KGC-7043 Instruction Manual 1995.*
"Using Java to Expand iTunes Functionality", by David Miller Sep. 3, 2003.*
PCT/IB2007/050438 International Search Report with Written Opinion, Jun. 5, 2007, 10 pages.

* cited by examiner

*Primary Examiner* — Pierre-Louis Desir
*Assistant Examiner* — Joshua Schwartz
(74) *Attorney, Agent, or Firm* — Harrity & Harrity, LLP

(57) ABSTRACT

A device may include logic to play songs. The device may also include a two level display. A first level of the display may display information to a user of the device, where the information is not associated with a song. A second level of the display may display graphical information to the user while a song is being played by the device.

7 Claims, 6 Drawing Sheets

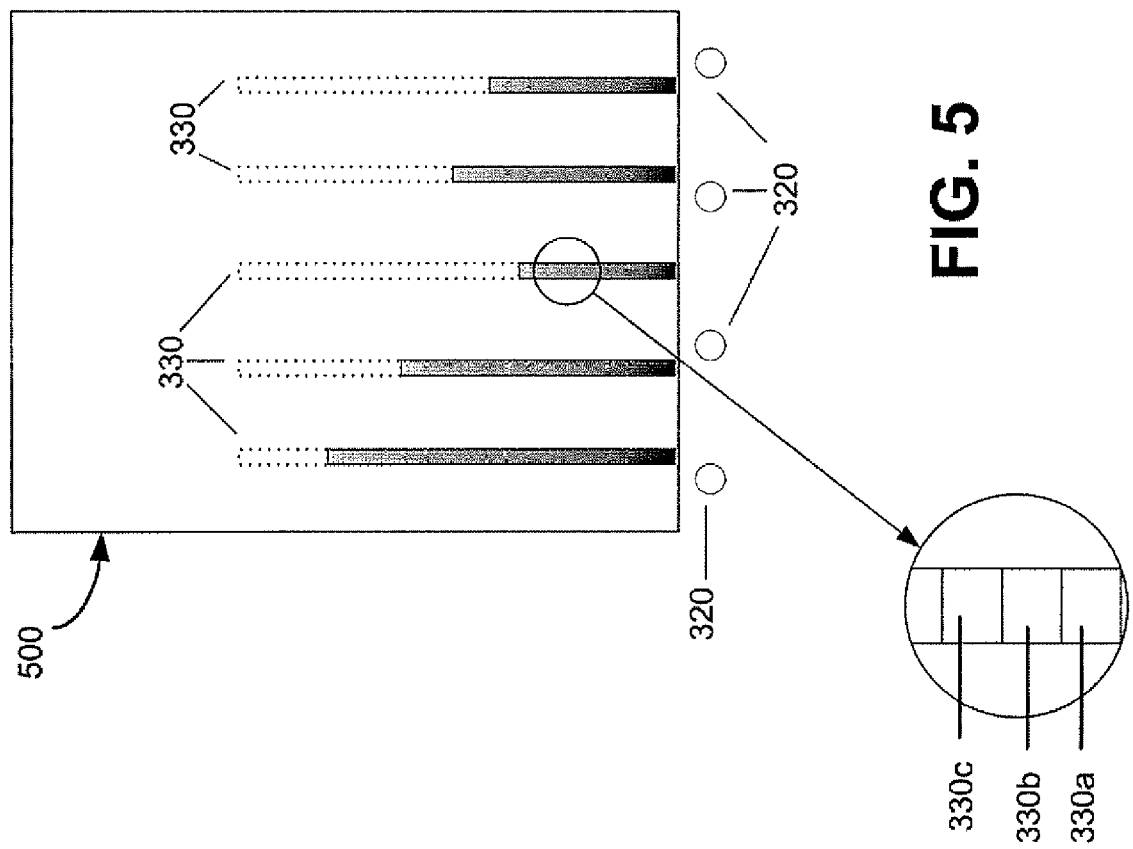

GRAPHICAL DISPLAY

RELATED APPLICATION

This application claims priority under 35 U.S.C. §119 based on U.S. Provisional Application No. 60/836,967, filed Aug. 11, 2006, the disclosure of which is hereby incorporated herein by reference.

TECHNICAL FIELD OF THE INVENTION

The invention relates generally to displays and, more particularly, to providing graphical information for display.

DESCRIPTION OF RELATED ART

Communication devices, such as cellular telephones, have become increasingly versatile. For example, cellular telephones often include applications or programs that enable users to obtain information, such as directions to a place of interest, sports scores and weather related information. Communication devices may also include applications that allow users to play music and games. Such applications have made communication devices increasingly important to users.

SUMMARY

According to one aspect, a mobile communication device may comprise a transmitter configured to transmit radio frequency signals and a receiver configured to receive radio frequency signals. The mobile communication device may further comprise a memory configured to store a plurality of audio files, logic configured to play a first one of the audio files and a display. The display may comprise a liquid crystal display configured to display information associated with a telephone call placed or received by the mobile communication device. The display may also comprise a plurality of visual elements located behind the liquid crystal display, the plurality of visual elements being configured to display graphical information to a user of the mobile communication device while the first audio file is being played.

Additionally, the graphical information may comprise a plurality of lighted columns having varying heights.

Additionally, the display may further comprise at least one lighting component, the at least one lighting component configured to backlight the liquid crystal display and deactivate or turn off upon activation of the plurality of visual elements.

Additionally, the plurality of visual elements may comprise a plurality of organic light emitting diodes.

Additionally, the plurality of visual elements may comprise a plurality of light emitting diodes.

Additionally, the plurality of visual elements may comprise electroluminescent film.

Additionally, the plurality of visual elements may be configured to be visible through the liquid crystal display.

Additionally, the plurality of visual elements may be configured to produce visual bars that dynamically vary in height as the first audio file is being played.

Additionally, the plurality of visual elements may be configured to produce a plurality of visual bars, where at least a first one of the bars comprises a plurality of colors.

Additionally, the plurality of visual elements may be configured to produce visual bars that vary in intensity as the first audio file is being played.

Additionally, the graphical information may correspond to at least one musical quality associated with the first audio file According to another aspect, a method performed in a device configured to play audio files may comprise storing a plurality of audio files and displaying first information to a user of the device via a first display component, the first information not being associated with the plurality of audio files. The method may also comprise playing a first one of the audio files and displaying, via second display components, graphical information to the user when the first audio file is played, the first display component being located above or over the second display components.

Additionally, the displaying graphical information may comprise displaying a plurality of lighted columns having varying heights.

Additionally, the method may comprise automatically powering off the first display component when the first audio file is playing.

Additionally, the displaying via second display components may comprise providing power to a plurality of light emitting diodes or electroluminescent film and generating a display comprising a plurality of visual bars having different heights.

Additionally, the generating a display may comprise dynamically varying at least one of the height of the bars, the color of the bars or the intensity of the bars as the first audio file is played.

Additionally, the generating a display may comprise dynamically varying the height of the bars based on frequency components of the first audio file.

According to still another aspect a device may comprise means for transmitting and receiving telephone calls and means for playing a song. The device may also include first display means for displaying information associated with a telephone call placed or received by the device and second display means located behind the first display means, the second display means configured to display graphical information to a user of the device while the song is played.

Additionally, the device may further comprise means for powering the second display means to generate the graphical information, the graphical information comprising a plurality of lighted columns having different heights.

According to yet another aspect, a device may comprise a memory configured to store a plurality of songs and logic configured to play a first one of the songs. The device may also comprise a two level display comprising a first level configured to display first information to a user of the device, the first information not being associated with the first song and a second level configured to display graphical information to the user while the first song is being played.

Additionally, the second level may be located behind the first level and may comprise at least one of a plurality of light emitting diodes or electroluminescent film.

Additionally, the graphical information may comprise a plurality of lighted columns having varying heights.

Additionally, the logic may be further configured to provide power to the second level to dynamically vary at least one of the heights, color or intensity of the lighted columns as the first song is played.

Other features and advantages of the invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation may represent like elements throughout.

FIG. 5 illustrates an exemplary graphical display provided by the mobile terminal of FIG. 1.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Figure 1:
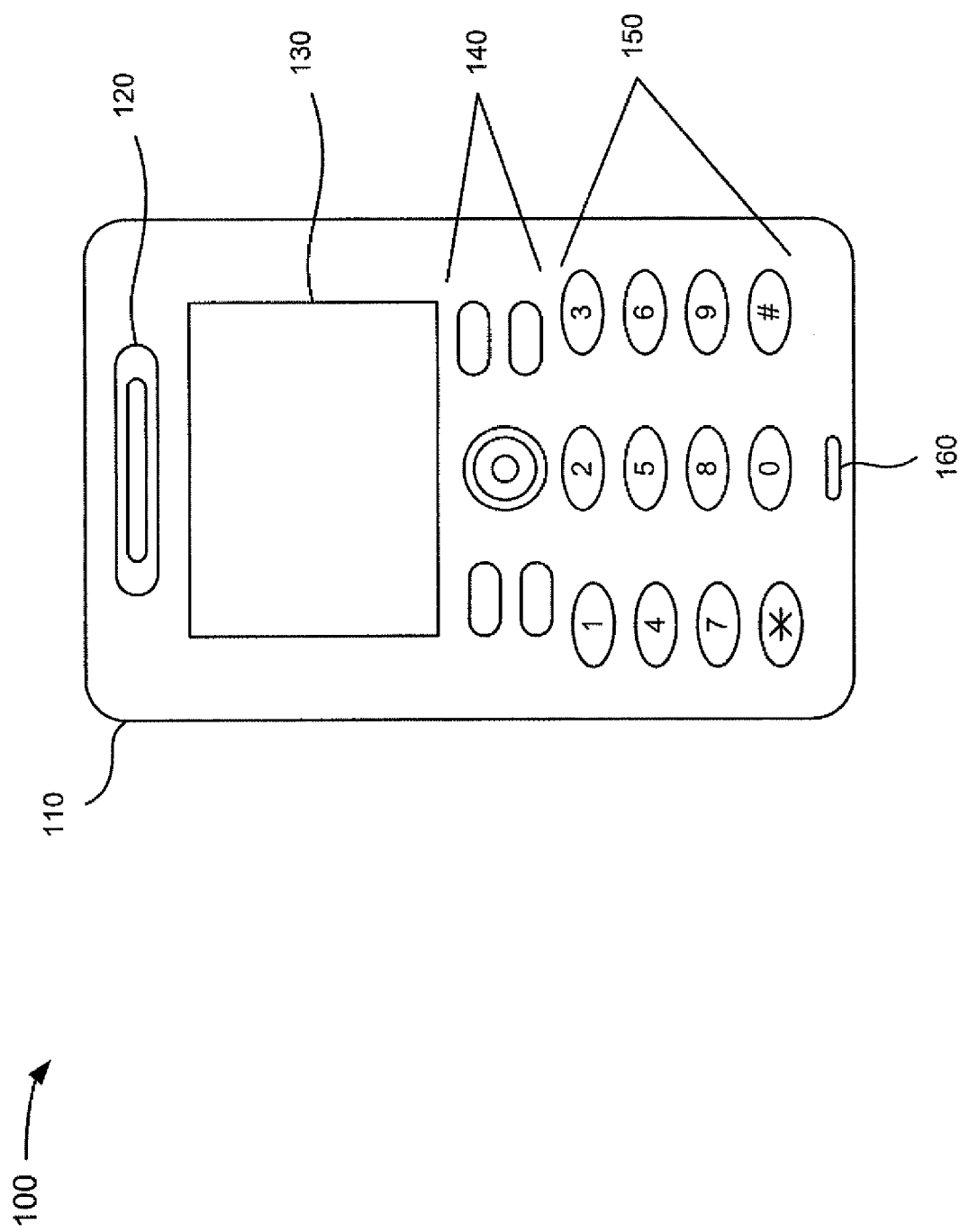
FIG. 1 is a diagram of an exemplary mobile terminal in which methods and systems described herein may be implemented.

FIG. 1 is a diagram of an exemplary mobile terminal 100 in which methods and systems described herein may be implemented. The invention is described herein in the context of a mobile terminal. As used herein, the term "mobile terminal" may include a cellular radiotelephone with or without a multi-line display; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices. Mobile terminal 100 may also include media playing capability, as described in detail below. It should also be understood that systems and methods described herein may also be implemented in other devices that include displays and media playing capability without including various other communication functionality.

Referring to FIG. 1, mobile terminal 100 may include a housing 110, a speaker 120, a display 130, control buttons 140, a keypad 150, and a microphone 160. Housing 110 may protect the components of mobile terminal 100 from outside elements. Speaker 120 may provide audible information to a user of mobile terminal 100.

Display 130 may provide visual information to the user. For example, display 130 may provide information regarding incoming or outgoing calls, games, phone books, the current time, etc. Display 130 may include a liquid crystal display (LCD) or some other type of display that displays graphical information to a user while mobile terminal 100 is operating. The LCD may be backlit using, for example, a number of light emitting diodes (LEDs).

In an exemplary implementation, as described in detail below, display 130 may also include additional elements/components that allow particular information to be displayed to the user of mobile terminal 100. For example, a number of organic LEDs (OLEDs), discrete LEDs, pixels made of electroluminescent film, etc., may be included in display 130 to provide the user with a graphical display when particular actions are performed by mobile terminal 100, as described in detail below.

Control buttons 140 may permit the user to interact with mobile terminal 100 to cause mobile terminal 100 to perform one or more operations, such as place a telephone call, play various media, etc. For example, control buttons 140 may include a dial button, hang up button, play button, etc. Control buttons 140 may also include a menu button that permits the user to view a menu associated with selecting functions, such as playing various media. Keypad 150 may include a standard telephone keypad. Microphone 160 may receive audible information from the user.

Figure 2:
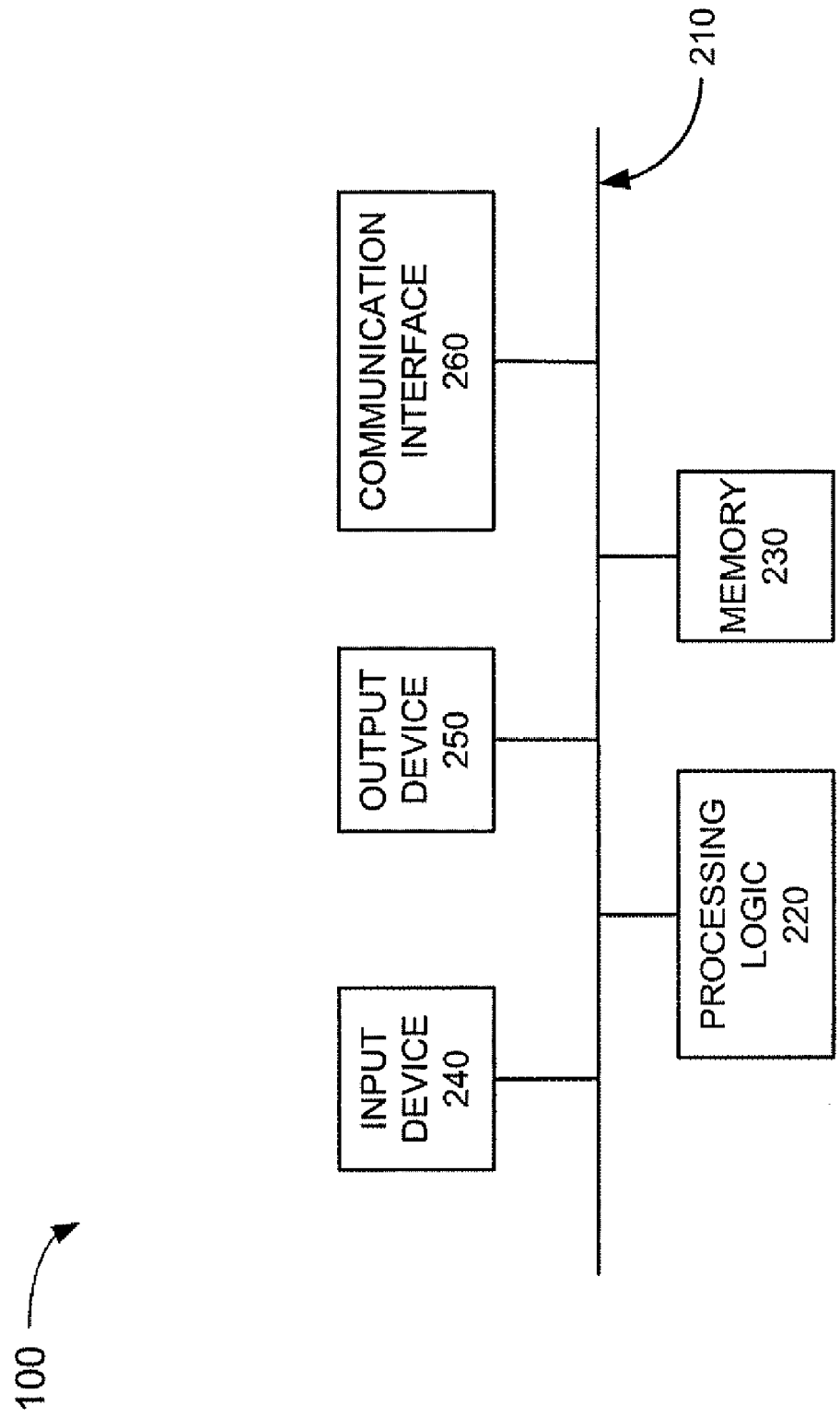
FIG. 2 is a diagram illustrating components of the mobile terminal of FIG. 1 according to an exemplary implementation.

FIG. 2 is a diagram illustrating components of mobile terminal 100 according to an exemplary implementation. Mobile terminal 100 may include bus 210, processing logic 220, memory 230, input device 240, output device 250 and communication interface 260. Bus 210 permits communication among the components of mobile terminal 100. One skilled in the art would recognize that mobile terminal 100 may be configured in a number of other ways and may include other or different elements. For example, mobile terminal 100 may include one or more power supplies (not shown). Mobile terminal 100 may also include one or more modulators, demodulators, encoders, decoders, etc., for processing data.

Processing logic 220 may include a processor, microprocessor, an application specific integrated circuit (ASIC), field programmable gate array (FPGA) or the like. Processing logic 220 may execute software instructions/programs or data structures to control operation of mobile terminal 100.

Memory 230 may include a random access memory (RAM) or another type of dynamic storage device that stores information and instructions for execution by processing logic 220; a read only memory (ROM) or another type of static storage device that stores static information and instructions for use by processing logic 220; a flash memory (e.g., an electrically erasable programmable read only memory (EEPROM)) device for storing information and instructions; and/or some other type of magnetic or optical recording medium and its corresponding drive. Memory 230 may also be used to store temporary variables or other intermediate information during execution of instructions by processing logic 220. Instructions used by processing logic 220 may also, or alternatively, be stored in another type of computer-readable medium accessible by processing logic 220. A computer-readable medium may include one or more memory devices and/or carrier waves.

Input device 240 may include mechanisms that permit an operator to input information to mobile terminal 100, such as microphone 160, keypad 150, control buttons 140, a keyboard, a keypad, a mouse, a pen, voice recognition and/or biometric mechanisms, etc.

Output device 250 may include one or more mechanisms that output information to the user, including a display, such as display 130, a printer, one or more speakers, such as speaker 120, etc. Output device 250 may also include a vibrator mechanism that causes mobile terminal 100 to vibrate when a call is received.

Communication interface 260 may include any transceiver-like mechanism that enables mobile terminal 100 to communicate with other devices and/or systems. For example, communication interface 260 may include a modem or an Ethernet interface to a LAN. Communication interface 260 may also include mechanisms for communicating via a network, such as a wireless network. For example, communication interface 260 may include one or more radio frequency (RF) transmitters, receivers and/or transceivers.

Communication interface 260 may also include one or more antennas for transmitting and receiving RF data.

Mobile terminal 100 may provide a platform for a user to play various media, such as music files, video files, multimedia files, games, etc. Mobile terminal 100 may also display information associated with the media played by mobile terminal 100 in a graphical format. Mobile terminal 100 may perform these operations in response to processing logic 220 executing sequences of instructions contained in a computer-readable medium, such as memory 230. Such instructions may be read into memory 230 from another computer-readable medium via, for example, communication interface 260. A computer-readable medium may include one or more memory devices and/or carrier waves. In alternative embodiments, hard-wired circuitry may be used in place of or in combination with software instructions to implement processes consistent with the invention. Thus, implementations described herein are not limited to any specific combination of hardware circuitry and software.

Figure 3A:
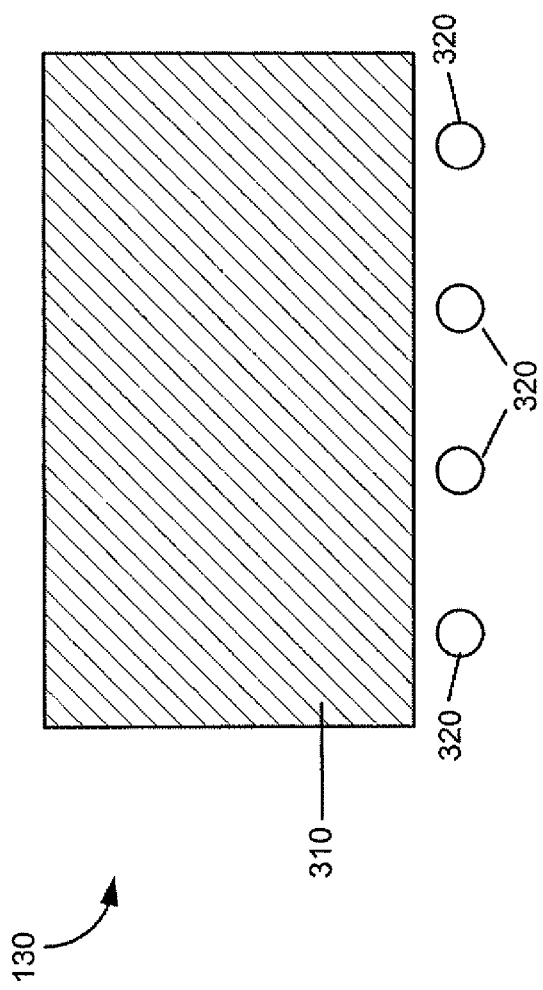
FIGS. 3A-3C illustrate portions of the display of FIG. 1 according to an exemplary implementation.
Figure 3B:
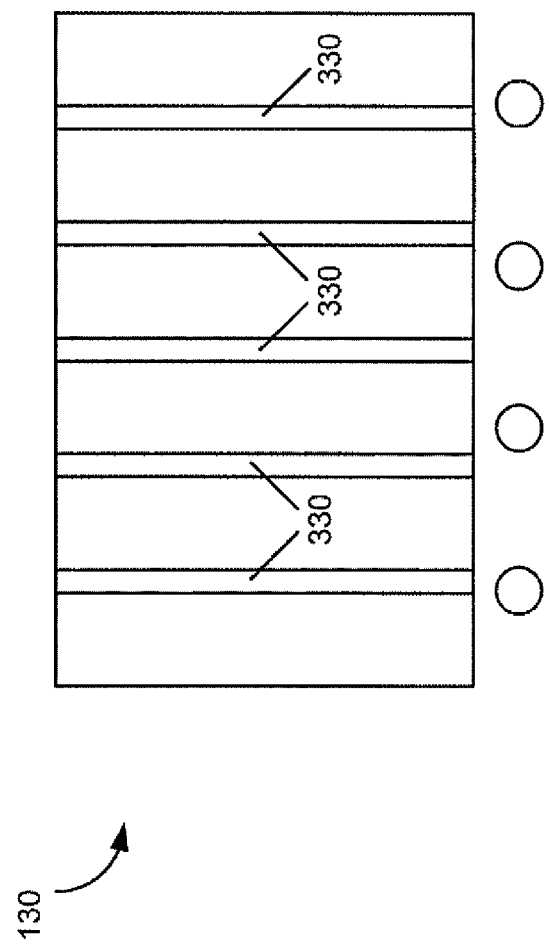
Figure 3C:
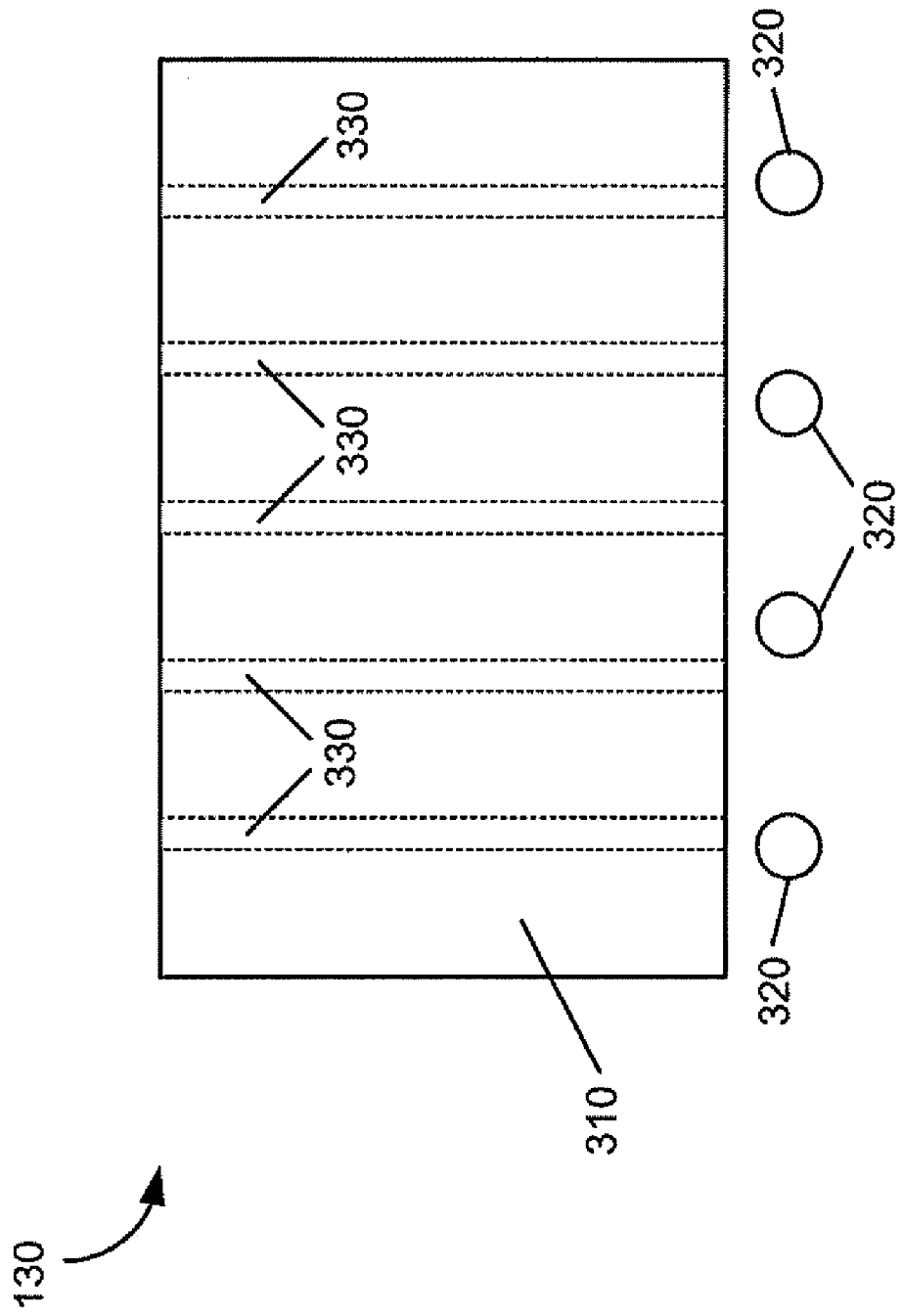

FIGS. 3A-3C illustrate various portions of display 130 in an exemplary implementation. Referring to FIG. 3A, display 130 may include an LCD 310 and a number of LEDs 320. LCD 310 is illustrated with cross-hatching for clarity purposes only. LCD 310 may display information to a user of mobile terminal 100, such as information regarding incoming or outgoing telephone calls (e.g., telephone numbers), a phone book with contact information, the current time, downloaded content (e.g., news or other information), games, etc.

LEDs 320 may be, for example, white LEDs, other color LEDs or a combination of various color LEDs that provide backlighting for LCD 310. Alternatively, LEDs 320 may include other lighting elements that provide backlighting for LCD 310. In an exemplary implementation, LCD 310 may be transmissive such that when LCD 310 is turned off (e.g., not backlit), light from elements located behind LCD 310 may pass through LCD 310 and be visible to a user.

In an exemplary implementation, display 130 may include additional elements. For example, FIG. 3B illustrates additional elements that may be located, for example, behind LCD 310. Referring to FIG. 3B, display 130 may include a number of columns 330, shown here in the shape of rectangular bars. Other shapes may also be used. LCD 310 is not illustrated in FIG. 3B for simplicity. LCD 310, however, may be located at a higher layer than columns 330. In other words, display 130 maybe a multi-level display with LCD 310 located at a level closest to the surface of display 130, while columns 330 may be located underneath or visually underlie LCD 310. Five columns 330 are illustrated in FIG. 3B for simplicity. However, more or fewer columns 330 may be included in alternative implementations. Columns 330 may have varying widths and/or heights with respect to one another and/or may be spaced varying distances apart with respect to one another. In addition, columns 330 may be vertical, horizontal and/or angled relative to display 130. Other layouts of columns 330 may also be possible.

Columns 330 may each include a number of OLEDs, discrete LEDs, pixels made of electroluminescent (EL) film or some other lighting components that allow columns 330 or selective portions of columns 330 to be visible to a user of mobile terminal 100 via display 130. For example, in one implementation, when mobile terminal 100 is playing music, the lighting components of columns 330 are powered/activated to provide a graphical display to the user of mobile terminal 100. In one implementation, columns 330 may be lighted to produce a graphical equalizer-type effect to the user of mobile terminal 100. For example, five columns 330 may be lit to varying heights that correspond to, or are intended to appear as, five different frequency bands of the music being played. That is, in some implementations, the information displayed via columns 330 may not actually correspond to frequency components of the music being played. In other words, display 130 may provide a pseudo-graphical equalizer look to the user of mobile terminal 100. For example, the visual qualities of columns 330 may be randomly generated and/or generated according to a predetermined pattern that is not related to the music being played. However, in some implementations, the lighting of columns 330 may correspond to levels of various frequency components (e.g., bass, treble, etc.) of the music being played by mobile terminal 100 or some other music related component, such as loudness. That is, various visual characteristics of columns 330 may relate to one or more music qualities of a particular piece of music/song being played. In each case, providing columns 330 that may be lit to various heights may provide for an enhanced experience by the user by including visual components during the playing of music by mobile terminal 100.

In each case, columns 330 may be visible through LCD 310 when music is being played by mobile terminal 100. For example, in some implementations, LEDs 320 that provide backlighting for LCD 310 may automatically deactivate/turn off when music begins playing to allow columns 330 to be more clearly displayed to the user of mobile terminal 100.

FIG. 3C illustrates display 130 with LCD 310 and columns 330 located behind LCD 310 (illustrated as dashed columns to denote that columns 330 are located behind or underneath LCD 310). LEDs 320 are also illustrated in FIG. 3C. Display 130, as described in more detail below, may allow the user of mobile terminal 100 to have a complementary audio and visual musical experience.

Figure 4:
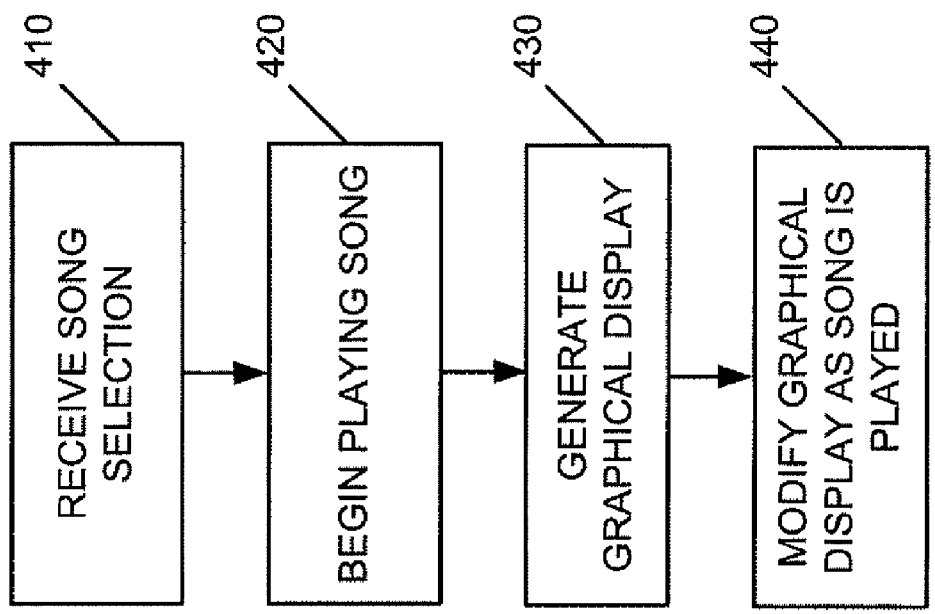
FIG. 4 is a flow diagram illustrating exemplary processing by the mobile terminal of FIG. 1.

FIG. 4 is a flow diagram illustrating processing by mobile terminal 100 in an exemplary implementation. Processing may begin, for example, when mobile terminal 100 powers up. Assume that the user of mobile terminal 100 has stored a number of media files, such as music files or songs in mobile terminal 100. The media files may be include, for example, MPEG audio layer 3 (MP3) files, wav files, etc. The media files may be stored in, for example, memory 230. Alternatively, mobile terminal 100 may retrieve media files from a source located externally from mobile terminal 100.

Assume that the user selects a particular song using, for example, control buttons 140 (act 410). Processing logic 220 may retrieve the song from, for example, memory 230 and begin playing the song (act 420).

In an exemplary implementation, processing logic 220 may signal output device 250 to turn off LEDs 320 when the song begins to play. Processing logic 220 may also signal output device 250 to display graphical information via display 130 as the song is being played (act 430). As described previously with respect to FIGS. 3B and 3C, display 130 may include display elements/components located behind LCD 310. These display elements may provide the user with a graphical equalizer type representation via display 130.

In an exemplary implementation, processing logic 220 may provide control instructions and/or power to display 130 to generate graphical display 500 illustrated in FIG. 5. Referring to FIG. 5, graphical display 500 may be output via display 130 and may include five columns 330 having varying heights. In the implementation illustrated in FIG. 5, the lighted portion of each column 330 may vary to create a graphic equalizer-type look. In addition, the shading of each column 330 may be gradual or incremental. That is, each column 330 may be very dark at its lowest portion and lighten up gradually from the bottom of each column 330 to the top of each column 330, as illustrated in FIG. 5. In this manner, an additional visual effect may be provided via graphical display 500. In other implementations, the color of each individual column 330 may vary. For example, the left most column may be green, the next column may be red, followed by blue, white and orange (or any other combination of colors). In addition, each column 330 may include several colors. In these implementations, the particular lighting elements that make up columns 330 may include different color LEDs, OLEDs, electroluminescent film, etc.

In addition, in some implementations, as the song is being played by mobile terminal 100, the lighted portion of each column 330 may change (act 440). For example, the lighted portion of each column 330 may increase and/or decrease in size as the song plays, thereby producing a dynamically varying movement effect with respect to columns 330. In other implementations, the lighting intensity of one or more of columns 330 may change as the song is played, the color of one or more columns 330 may change as the song is played or any combination of height, color and lighting intensity may change as the song is played.

FIG. 5 also illustrates an exploded view of a portion of the one of lighted columns 330. Referring to FIG. 5, the exploded portion of the center column 330 illustrates that each column 330 includes a number of individual cells or pixels, labeled 330a, 330b and 330c. Processing logic 220 may control power to each of these cells/pixels individually or in groups to thereby turn on/off the cells/pixels to create a desired effect. That is, processing logic 220 may control the power supplied to the appropriate lighting elements (LEDs, OLEDs, EL film, etc.) to provide a dynamic graphical display that provides interesting visual effects to the user of mobile terminal 100.

Further, in some implementations, the size of the lighted portion of columns 330 may change based on the particular frequency components of the music. That is, if a frequency component at a low frequency (e.g., bass component) increases during the song, one of columns 330 that may correspond to this frequency component, such as the left most column 330, may increase in height. Alternatively, the increasing/decreasing heights of column 330 may be provided in a predetermined manner by processing logic 220 to create a pleasing visual effect.

Graphical display 500 may also display other information to the user of mobile terminal 100. For example, the title and/or artist of a song may be displayed to the user along with lighted columns 330. In some implementations, mobile terminal 100 may allow the user to customize the particular display based on his/her preferences. For example, input device 240 may provide a menu of options to the user. The menu may allow the user to select what information will be displayed on the graphical display, such as the colors of columns 330 and whether any text will be provided in the display.

In implementations described above, columns 330 may be displayed to the user of mobile terminal 100 as a song is played. When music is not being played by mobile terminal 100, columns 330 are not normally powered and are therefore not visible to the user. In addition, providing a display that includes columns of pixels (e.g., columns 330), as opposed to a complete rectangular matrix display, allows mobile terminal 100 to conserve considerable power when the second level display (i.e., the display located under LCD 310) is powered.

For example, OLEDs, LEDs or EL film that makes up columns 330 may be powered while space between columns 330 is not powered. In this manner, mobile terminal 100 may conserver power by not providing power to areas of display 130 that are not associated with creating the desired graphical effect.

As an example, in one implementation, 115 orange LEDs may be used to light columns 330, where each LED may draw approximately 1 milliamp of current when activated/powered. Powering all 115 LEDs, including drive circuitry associated with the LEDs, may create a voltage drop of approximately two volts. Such a voltage drop and power draw associated with powering the LEDs will not cause problems associated with operation of mobile terminal 100. In addition, powering the LEDs will also not drain a battery/power source of mobile terminal 100 significantly.

CONCLUSION

Implementations described herein allow a user to view graphical information associated with music being played. Advantageously, this may increase a user's satisfaction level with respect to listening to music. In addition, implementations described herein provide graphical information to the user without drawing significant power resources.

The foregoing description of the embodiments of the invention provides illustration and description, but is not intended to be exhaustive or to limit the invention to the precise form disclosed. Modifications and variations are possible in light of the above teachings or may be acquired from practice of the invention.

For example, aspects of the invention have been mainly described in the context of a mobile terminal that also plays music files. The invention, however, may be used with any type of media player that does not include communication functionality. For example, aspects of the invention may be implemented in a personal computer, laptop computer, personal digital assistant (PDA), MP3 player, or any other device with media-playing capability. In addition, aspects of the invention have been described as playing songs/music stored locally at mobile terminal 100. In other implementations, the songs/music may represent content accessed from an external device, such as a server accessible to mobile terminal 100, songs received from a radio station, etc.

Still further, aspects of the invention have been described above with respect to displaying a number of visual bars to create a graphic equalizer type visual effect. In other implementations, other graphical representations, such as other designs or patterns may be created. For example, various abstract shapes or designs may be created using lighting components that may be activated when music is playing.

Further, while series of acts has been described with respect to FIG. 4, the order of the acts may be varied in other implementations consistent with the invention. Moreover, non-dependent acts may be performed in parallel.

It will also be apparent to one of ordinary skill in the art that aspects of the invention may be implemented in methods and/or computer program products. Accordingly, the invention may be embodied in hardware and/or in software (including firmware, resident software, micro-code, etc.). Furthermore, the invention may take the form of a computer program product on a computer-usable or computer-readable storage medium having computer-usable or computer-readable program code embodied in the medium for use by or in connection with an instruction execution system. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as a processor, microprocessor, an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A mobile communication device, comprising:
   a transmitter to transmit radio frequency signals;
   a receiver to receive radio frequency signals;
   a memory to store an audio file;
   a display comprising:
      a first layer including a liquid crystal display, the first layer to display, to a user of the mobile communication device, information associated with a telephone call placed or received by the mobile communication device via the transmitter and the receiver, where the first layer includes a first portion and a second portion that differs from the first portion,
      a second layer including a plurality of pixels, the second layer being located behind the first portion and not the second portion such that the plurality of pixels are visible, to the user, through the first portion and not the second portion, the second layer differing from the first layer, and
      a third layer including at least one lighting component to provide backlight to the first layer, the third layer differing from the first layer and second layer; and
   a processor to:
      play, to the user, the audio file, where, when playing the audio file, the processor is further to:
         deactivate the first layer and the third layer, and
         selectively activate one or more of the plurality of pixels to form a plurality of visual elements corresponding to musical characteristics associated with the audio file, where the plurality of visual elements comprise a plurality of visual bars that vary in height according to the musical characteristics, and
         deactivate the second layer when the audio file is not played.

2. The mobile communication device 1, where the second layer comprises a plurality of organic light emitting diodes.

3. The mobile communication device of claim 1, where the second layer comprises a plurality of light emitting diodes.

4. The mobile communication device of claim 1, where the second layer comprises an electroluminescent film.

5. The mobile communication device of claim 1, where each of the plurality of visual bars comprises a plurality of colors, and
   where the processor, when selectively activating one or more of the plurality of pixels, is further to vary the plurality of colors according to the musical characteristics.

6. The mobile communication device of claim 1, where the processor, when selectively activating one or more of the plurality of pixels, is further to vary an intensity associated with each of the visual bars.

7. The mobile communication device of claim 1, where each of the plurality of visual bars corresponds to a frequency band.

* * * * *